United States Patent

[11] 3,553,455

[72] Inventors Takayoshi Sato;
Makoto Ohtake, Tokyo; Isao Saruyama, Kawaguchi, Japan
[21] Appl. No. 802,340
[22] Filed Feb. 26, 1969
[45] Patented Jan. 5, 1971
[73] Assignee Kabushiki Kaisha Koparu
[32] Priority Mar. 1, 1968, May 4, 1968
[33] Japan
[31] 43/13391 and 43/29704

[54] AUTOMATIC FOCUSING APPARATUS BY MEANS OF PHASE DISCRIMINATION
4 Claims, 17 Drawing Figs.

[52] U.S. Cl. ................................................. 250/201,
250/208, 250/232, 250/237, 356/123
[51] Int. Cl. ..................................................... G01d 5/36,
G01j 1/36, H01j 39/12
[50] Field of Search .......................................... 250/201,
208, 239, 232; 356/123

[56] References Cited
UNITED STATES PATENTS

| | | | |
|---|---|---|---|
| 2,740,961 | 4/1956 | Slater | 250/201X |
| 2,831,057 | 4/1958 | Orthuber | 250/201X |
| 2,838,600 | 6/1958 | Salinger | 250/201X |
| 2,897,373 | 7/1959 | Lesti | 250/201 |
| 3,038,369 | 6/1962 | Davis | 250/201 |

*Primary Examiner*—James W. Lawrence
*Assistant Examiner*—C. R. Campbell
*Attorney*—Otto John Munz

ABSTRACT: By arranging the optical system so as to perform the comparison of two types of rectangular waves so converted from two kinds of pattern of the object scanned after passing through a movable lens system and a fixed lens system, and to thereby control so as to reduce to nil amount of difference existing between the phases of these two rectangular waves, the distance between the object and the focal plane can be measured with greatly enhanced precision and speed.

AUTOMATIC FOCUSING APPARATUS BY MEANS OF PHASE DISCRIMINATION

BACKGROUND OF THE INVENTION

1. Field of the Invention

The present invention is concerned with an automatic focusing apparatus, and more particularly, it relates to an automatic focusing apparatus in the optical system which utilizes an electric distance measuring means.

2. Description of the Prior Art

The well-known automatic focusing apparatuses may be divided into the following two types depending on the manner in which the electric signals obtained from the scanning of the image is utilized. One such type utilizes the increased high frequency component of the electric signals resulting from an increase in the sharpness of the image contrasts which, in turn, is caused by an enhanced precision of the image of the object which is focused on the focal plane. The other of said two types contemplates automatic focusing by conducting a comparison of the phase relationship between the two electric signal waves which are generated in association with the various intensities of light coming from the object through a fixed lens and a movable lens which are both included in an optical rangefinder, for example, the split image type.

The automatic focusing apparatus of the prior art which falls under the category of the former comprises a rotary slit intended for scanning the pattern of the object which is to be focused on the focal plane, means responsive to the intensities of light coming from said pattern which is scanned, a frequency discriminator, a servomotor and an objective lens.

The focusing was carried out by moving the objective lens by the use of the servomotor until said lens was brought to the position in which was obtained the maximum increase in the amount of the high frequency components contained in the output of said frequency discriminator. However, it was extremely difficult to take out, from such an object as scenery which contained various different image contrasts, only those components of a high frequency, and for this reason, it was difficult to apply this apparatus to practical purposes.

Also, the conventional automatic focusing apparatus belonging to the latter type attempted to control the amount of movement of the objective lens by the direct comparison, by the use of a phase detector, of a pair of electric signal wave patterns which corresponded to a pair of split images obtained through a fixed lens and a movable lens. It was, however, as much difficult as was in the foregoing type, to perform an exact comparison of those signal wave patterns containing alternate current components of various complicated shapes resulting from complicated image contrasts, and thus, the apparatus of this type also was far from being practical. Unfortunately, however, there has been elucidated as yet no effective means for treating the wave patterns to find the correct time at which the best focus is obtained.

SUMMARY OF THE INVENTION

It is, therefore, an object of the present invention to eliminate the difficulty and inconvenience of the prior art and to provide an improved automatic focusing apparatus equipped with an electric distance measuring means so arranged as to remove those unnecessary frequency components which often constitute the cause for an erroneous measurement, by amplifying, up to complete saturation, the two electric signal wave patterns which are generated in a light responsive means in conformity to the various intensities of light coming from the object through a fixed lens and a movable lens to convert said two electric signal wave patterns to two kinds of rectangular waves, thereby making it possible to perform a precise and accurate discrimination of the degree of the agreement of the phase of these two rectangular waves.

Another object of the present invention is to provide an improved scanning member structure which allows the light responsive means to most faithfully covert the image patterns rich in image contrasts produced on the focal plane to continuous electric signals. By the provision of this improved scanning member structure, there is obtained a most reliable high precision automatic focusing apparatus.

Still another object of the present invention is to provide an improved automatic focusing apparatus which is capable of making an unmistakable detection of the actual phase relationship between the two rectangular electric signal waves as to which of these two is advanced or delayed, by treating, in the gate circuits, the two rectangular electric signals which indirectly correspond to the image contrasts of the object (which are transmitted through a fixed lens and a movable lens) in combination with the rectangular reference electric signal obtained from the vibrations of the vibrating plate element which is contained in the scanning member, to thereby determine the polarity of the current supplied from the power source connected to the servomotor and to thus enable the servomotor to control said movable lens as well as the objective lens which is matched with said movable lens.

These and other objects as well as the attendant advantages of the present invention will be understood more clearly by reading the following detailed description in conjunction with the accompanying drawings which are given by way of example and not by way of limitation.

BRIEF DESCRIPTION OF THE DRAWING

FIGS. 8a, 8b, L 8c and 8d

DESCRIPTION OF THE PREFERRED EMBODIMENTS

Figure 1:
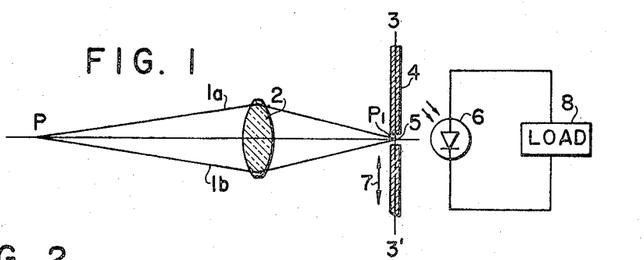
FIG. 1 is a more or less diagrammatic explanatory representation showing the principle of the light receiving device of the present invention.

Referring now to FIG. 1, there is briefly illustrated the light receiving device which is employed in the present invention. Lines 1a and 1b represent the light rays which are originated from a point P of the object to be photographed and which are focused, by virtue of an objective lens, onto the point $P_1$ on the focal plane indicated by 3–3' which also represents the position in which a vibrating plate element 4 is disposed. This vibrating plate element 4 may be displaced sideways within the permissible range of depth of focus. In case the object is a scenery or landscape which is usually encountered or viewed and not a single point, the pattern of such a scenery or landscape is depicted on the focal plane or, in other words, on the vibrating plate element 4. This vibrating plate element 4 is provided with a slit 5 which is, for example, 2 mm in length and 0.3 mm in breadth. This vibrating plate element 4 is adapted to vibrate vertically with a predetermined amplitude of, for example, 2 mm. 50 Hz, in the directions indicated by the double-headed arrow 7 in the foreground of a photoelectric element 6. It is to be understood that both the amplitude of vibration and the length of the slit serve as the factors to determine the range in which the image pattern located on the focal plane is scanned. The photoelectric element 6, such as a silicon photocell, which is disposed quite close (for example, of the order of 0.3 mm) to the thin vibrating plate element 4 which is placed on the focal plane converts the intensities of light of the scene which is transmitted through the slit 5 to a pulsating electric signal by which the electric load 8 is caused to pass off a photoelectric current. It is to be understood, no doubt, that, instead of a silicon photocell, there can be used a photoelectric element such as cadmium sulfide in combination with a battery.

Figure 2:
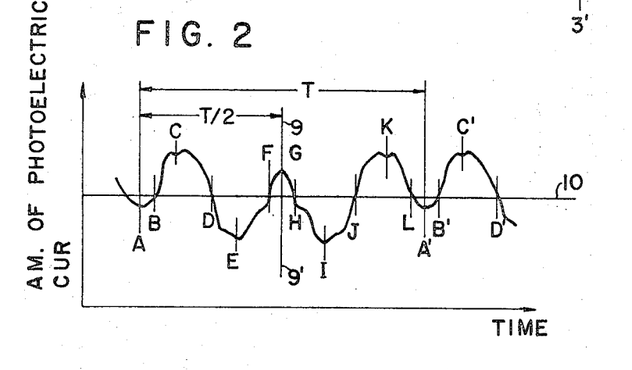
FIG. 2 is a diagrammatic representation showing a series of pulsating electric signal wave patterns which have been so converted by the photoelectric element contained in the arrangement of the light receiving device of FIG. 1.

In FIG. 2, there is shown an example of the photoelectric current which varies in intensity from one moment to another as the slit 5 effects the scanning by virtue of the vibrations of the vibrating plate element 4. The alternate current components of the electric signal waves which are shown in FIG. 2 as being the photoelectric current are subjected to the influence of the image contrasts of the image focused on the focal plane. Assuming now that the cycle of vibration of the vibrating plate element 4 is T, it will be understood that the waveforms contained between A—A' in FIG. 2 represent the recurrences of waveforms with a cycle of T. It will also be noted from FIG. 2 that the waveforms are displayed in the form of symmetry with respect to the vertical line 9—9'. This means that the upward movement of the slit represents the scanning ranging from A to G, while the sequential downward movement of the slit represents the scanning of the range between G—A'.

Figure 3:
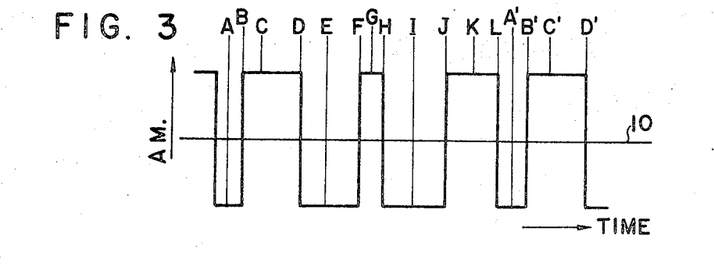
FIG. 3 is a diagrammatic representation showing the rectangular signal wave patterns so converted from those electric signal wave patterns shown in FIG. 2.

The automatic focusing apparatus of the present invention is operative in such a way that, from the image signal waves shown in FIG. 2, are directly taken out these alternate current components which correspond to the image contrasts, and these alternate current components are transmitted to a first amplifier and a second amplifier which will be described later and they are amplified until they become saturated, and these saturated components are converted to rectangular waveforms as the ones shown in FIG. 3 which, as the result of the aforesaid saturation, are made to indirectly follow the image contrasts, and these rectangular waveforms are utilized in effecting the automatic focusing. It is to be noted that the positions A—D' of the rectangular signal waves shown in FIG. 3 correspond to the positions A—D' shown in FIG. 2, respectively. For this reason, the rectangular signal waves are related to only those particular positions B, D, F, H, J, L, B', D',—of the signal waves of FIG. 2 and are not related to those intermediate positions A, C, E, G, I, K, A', C', —. It is to be noted also that the reference level 10 of the signal waves resulting from the image contrasts depends chiefly on the lower frequency characteristic of the amplifier and also on the bias voltage or the performance characteristics. The reference level of the amplifier which bears a sufficient amplification gain relative to the frequency of vibration of the vibrating plate element 4 will assume a rectilinear line 10 as shown in FIGS. 2 and 3.

Such a conversion of the electric signals containing alternate current components and having been subjected to the influence of the image contrasts of the pattern of the object for being scanned to rectangular electric signals are quite useful in the separation or discrimination which will be described in further detail later of the two sequential signal waves resulting from the incipient light rays passing through the fixed lens and the movable lens.

The automatic focusing apparatus of the present invention which is capable of having the image of the object focused automatically on the film contained in a camera or the like contains an electric distance measuring means for automatically finding the distance between the object and the photographer. The arrangement of this electric distance measuring means is shown in FIG. 4.

Figure 4:
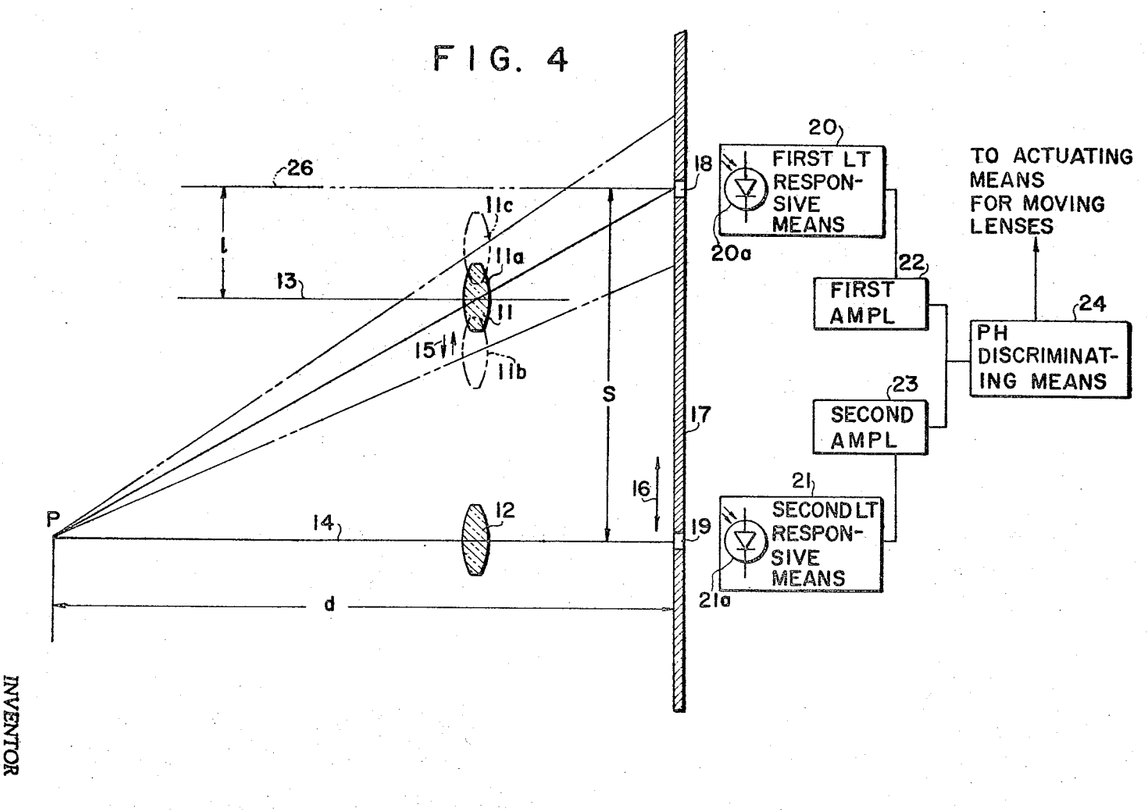
FIG. 4 is a diagrammatic explanatory representation showing the essential elements of the electric distance measuring means of the present invention.

In FIG. 4, the optical axes 13 and 14 of a movable lens 11 and a fixed lens 12, respectively, are disposed so as to be in parallel to each other. The movable lens 11 is adapted to move in the direction perpendicular, i.e. in the direction indicated by the arrow 15, to the optical axis 13. A vibrating plate element 17 which is provided with a pair of slits 18 and 19 is adapted to vibrate continuously within the focal plane in the direction of the arrow 16 behind a pair of lenses 11 and 12 in the foreground of a first photoelectric element 20a and a second photoelectric element 21a. Silicon photo cells or photoelectric elements 20a and 21a. such as those made of cadmium sulfide should be disposed quite close to or in close contact with the rear side of the slits 18 and 19 of the vibrating plate element 17. The disposition of the photoelectric elements 20a and 21a in close contact with the rear side of the slits 18 and 19 means that the intensities of the most sharply focused image are converted to electric signals, which, in turn, serve to enhance the degree of precision of the behavior of the electric distance measuring means. The outputs of the first and the second light responsive means 20 and 21 are transmitted to a first amplifier 22 and a second amplifier 23, respectively, both of which are of the ability to amplify the input signal waves till they become saturated and to thereby convert them to rectangular waves. Both of these rectangular wave outputs of the first and the second amplifiers 22 and 23 are then transmitted together to a phase discriminating means 24 where the phase relationship between these two rectangular waves is compared, so that discrimination is made as to whether these two rectangular waves are of the identical phase to each other or they are out of phase relative to each other.

Figure 5:
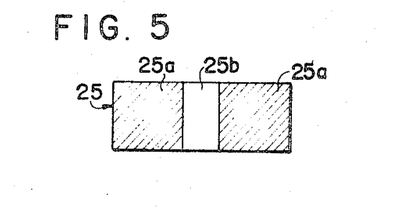
FIG. 5 is a diagrammatic explanatory representation of a simple style scanning pattern which is so prepared as to be convenient for the explanation.
Figure 6A:
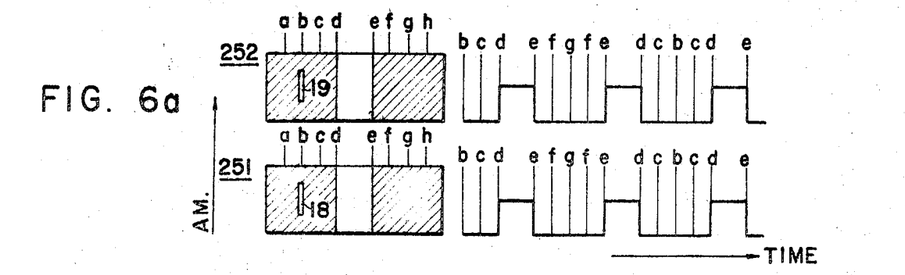
FIGS. 6a, 6b and 6c are diagrammatic representations each showing a pair of rectangular electric signal wave patterns which are produced on the focal plane by a fixed lens and a movable lens, in phase relationship with the scanning patterns shown in FIG. 5 and with a pair of slits which are disposed so as to face said two lenses.
Figure 6B:
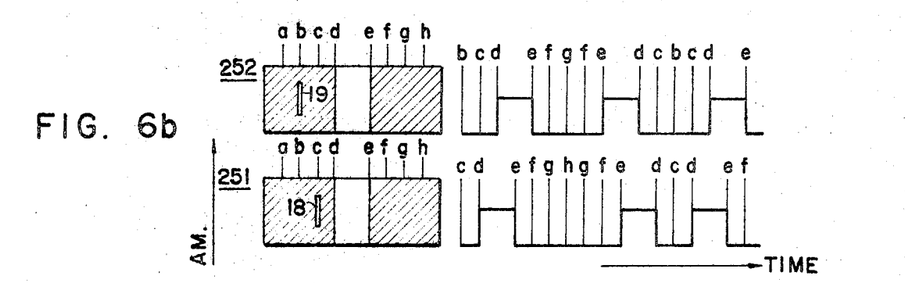
Figure 6C:
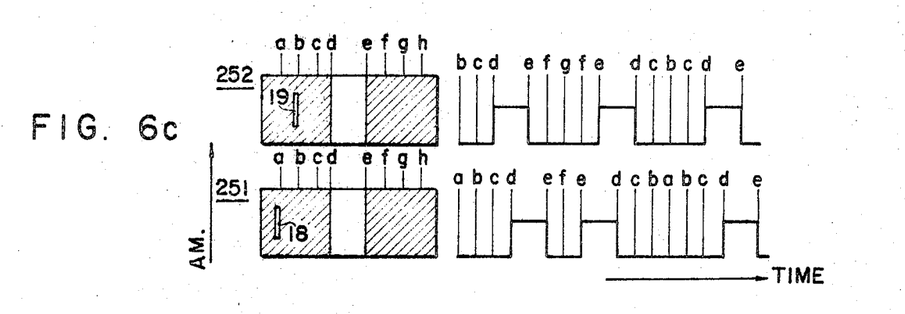

Now, in order to explain chiefly the electric behaviors of the elements shown in FIG. 4, there is utilized a simple pattern 25 of the object to be scanned which comprises a dark region 25a indicated by oblique lines and a light region 25b as shown in FIG. 5. When the vibrating plate element 17 vibrates while the simple pattern 25 of the object is focused on each of the focal plane by virtue of the movable lens 11 and the fixed lens 12, the light responsive means 20 and 21 will convert the intensities of light of the pattern 25 transmitted through the slits 18 and 19 to electric signals, respectively. The outputs of the first and the second amplifiers 22 and 23 which are adapted to convert these electric signals to rectangular waves are shown in FIGS. 6a through 6c in positional relationship with a pair of patterns, i.e. between the pattern 251 produced by the movable lens 11 and the pattern 252 produced by both the fixed lens 12 and a pair of slits. In FIG. 6a, the first and the second slits 18 and 19 repeat their vibration cycle b—g—b starting at the same position b of the pattern 25 (251 or 252). During these behaviors of the slits, the first and the second amplifiers 22 and 23 will give output signals which are identical in phase. In FIG. 6b, the first slit 18 starts the scanning at the position c of the pattern 25 and repeats the movement cycle of c— h—c, whereas the second slit 19 behaves in the same way as that described in connection with FIG. 6a. It will be noted that the phase of the output signal given by the first amplifier 22 at this stage is advanced beyond the phase of the output of the second amplifier 23. Next, in FIG. 6c, the first slit 18 carries out the scanning, starting at the position a of the pattern 25 and repeats the movement cycle a—f—a. Whereas, the second slit 19 behaves in the same way as that described in connection with FIG. 6a. In this stage of operation, the output signal of the first amplifier 22 has a phase which is delayed relative to the phase of the output signal given by the second amplifier 23.

Now, let us observe the positions assumed by the movable lens 11 by referring again to FIG. 4 which represents the essential elements of the electric distance measuring means which are illustrated in somewhat exaggeration with respect to dimension but rather descriptive for the convenience of explanation. It will be understood from this drawing that the position 11a which is shown in solid line, and the positions 11b and 11c which are drawn in dotted lines correspond to FIGS. 6a, 6b and 6c, respectively. Accordingly, as is well known by those skilled in the field of optical rangefinders containing a fixed lens and a movable lens, it will be understood that, if the distance $l$ between the optical axis 13 and the line 26 when the movable lens 11 is in the position 11a is known, there can be calculated the distance $d$ between the object P to be photographed and the photographer or the focal plane. Assuming now that the distance these two slits 18 and 19 is S, there is obtained an equation: $dS. E. 1/l$, wherein F represents the focal distance common to both lenses 11 and 12. Accordingly, by moving the position of the movable lens 11, and by thus finding the distance $l$ at which the difference between the phases of the output signal waves of the first and the second amplifiers will be nil, there can be obtained the distance $d$ between the photographer and the object. Thus, through the objective lens (not shown) which is preliminarily arranged so as to be matched and coupled, via cam means and lever means, to the movable lens 11, there is precisely focused the image or the pattern of the object on the film contained in the camera.

Figure 7:
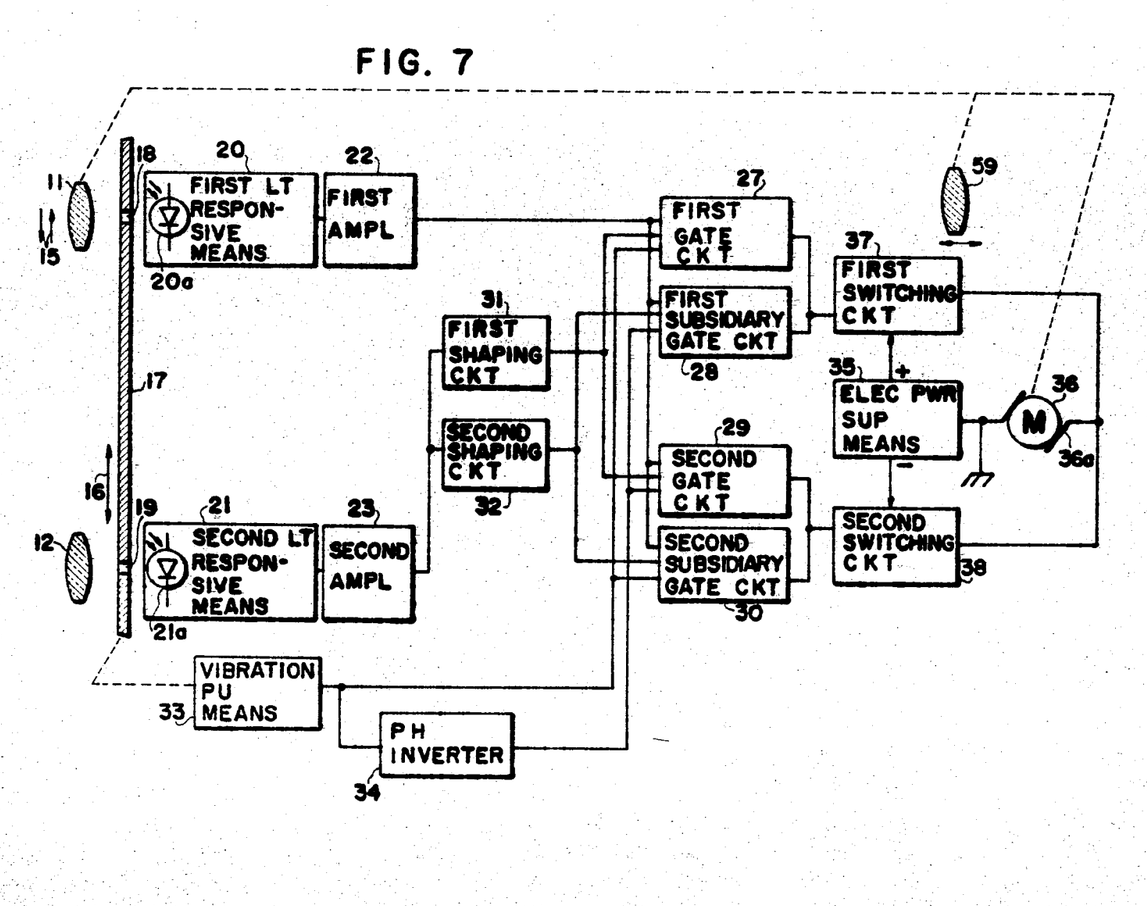
FIG. 7 is a more or less diagrammatic representation showing another embodiment of the present invention which is derived from the arrangement shown in FIG. 4.

In FIG. 7, there is shown another embodiment of the automatic focusing apparatus of the present invention which utilizes an electric distance measuring means. The electric behavior of this automatic focusing apparatus will be easily understood by referring to FIGS. 8a through 8d and FIGS. 9a through 9d each illustrating the wave pattern produced in each group of the electric circuits when a pair of slits 18 and 19 scan the simple pattern 25 shown in FIG. 5. In these FIGS. of the drawing, like reference numerals indicate those constitutional elements which behave in the same way as those described in the preceding embodiment.

By referring now to FIG. 7, there is seen that a vibration plate element 17 having a first slit 18 and a second slit 19 is disposed on the focal plane common to both of a movable lens 11 and a fixed lens 12, in much the same way as the arrangement described in connection with the preceding embodiment. Photoelectric elements 20a and 21a are disposed immediately behind the vibrating plate element 17. The output of a first light responsive electric means 20 which contains a photoelectric element 20a is transmitted, via a first amplifier 22 which is capable of converting the input signals to rectangular waves, to a first gate circuit 27, then to a first subsidiary gate circuit 28, then to a second gate circuit 29 and therefrom to a second subsidiary gate circuit 30, in this order. These four gate circuits may each be comprised of a phase discriminator or a logic circuit. However, in order to make the explanation short and clear, the gating behaviors of the instance where the first and the second gate circuits 27 and 29 are comprised of "AND" circuits, and where the first and the second subsidiary gate circuits 28 and 30 are comprised of "NAND" circuits, are shown in the form of electric signal waves in FIGS. 8a through 8d and FIGS. 9a through 9d. The output of the second light responsive electric means 21 is transmitted, via second amplifier 23 which functions in the same way as that of the first amplifier 22, to a first shaping circuit 31 which is adapted to convert at the rising-up position of the input signal the rectangular input signal to a positive pulse wave having a narrow breadth, and further to a second shaping circuit 32 which is adapted for converting, at the depressed position, the rectangular input signal to a negative pulse wave having a narrow breadth, respectively. This first shaping circuit 31 is comprised of a differentiating circuit, rectifier for deriving the positive waves and an amplifier, so as to be operative in such a way as to derive only the positive pulses from those sharp positive and negative pulses which have been obtained by differentiating the rectangular output waves of the second amplifier 23 and to amplify these positive pulses thus derived. On the other hand, the second shaping circuit 32 is comprised in the same fashion as that of the first shaping circuit 31 excepting the rectifier for deriving the positive waves which is substituted by a rectifier which is adapted to derive the negative waves. These amplifiers, however, may each be a single stable multivibrator. The output of the first shaping circuit 31 is transmitted to the first and the second gate circuits 27 and 28, whereas the output of the second shaping circuit 32 is transmitted to the first and the second subsidiary gate circuits 28 and 30, respectively.

In the embodiment shown in FIG. 7, it is noteworthy that the vibrations of the vibrating plate element 17 are converted, by a vibration pick up means, to electric signals. Referring now to FIG. 6 again, it will be noted that, in FIG. 6b for example, during the period of the rightwise scanning ($c \rightarrow h$) of the slit 18, the output waveform of the first amplifier 22 shows an advanced phase, in contrast to the delayed phase shown during the leftwise scanning period ($h \rightarrow c$). As described above, there arises the change in the positions of these two rectangular waves for each hemicycle of the vibrating plate element 17, and this holds true also in the example of FIG. 6c. Therefore, the comparison, by the use of a phase detector which is generally utilized, of the two rectangular waves which are derived from the first and the second amplifiers 22 and 23 represents nothing in particular but a mere evaluation of whether or not these two rectangular waves are identical in phase relative to each other. In other words, it is not known which of these two rectangular waves is advanced in phase during the rightwise scanning period of the slits. Accordingly, there arises the inconvenience of the absence of the information as to the correct direction in which the movable lens or the objective lens is to be directed in order to bring the objective lens in focus by reconciling the phases of these two rectangular waves with each other. It should be noted, however, that such an apparent inconvenience will not constitute any serious problem with still cameras. This is because this inconvenience can be solved, in still cameras, by operating, during the period where the camera which is adapted to take photographs one strip of film after another in separate operations is not in use, the lens system in such a way that both the objective lens and the movable lens are always brought to the focusing position of an object situated at infinite distance by the force of, for example, a coil spring, whereas at the time of taking a photograph, both of these lenses are adjusted of their positions so as to be moved toward the position at which the object situated at a close distance is to be focused, continuously until there is obtained the agreement in the phases of the two kinds of rectangular waves. This means, in FIG. 4, that during the period in which no photograph is taken, the position of the optical axis 13 of the movable lens 11 is always in agreement with the position of the line 26, and that, on the other hand, at the time of taking a photograph, the movable lens 11 gradually moves downwardly up to the position 11a. Such movement of the movable lens and accordingly the movement of the objective lens which is matched with the movable lens will never fail to find, during their movements, a position in which the phases of the two rectangular waves agree to each other.

In a motion picture camera which is so designed as to take photographs of the object in sequential succession, there is no sufficient time left for the photographing operation, at the end of photographing of each strip of film, to wait until the objective lens and the movable lens return to the position of focusing the image of the object. Therefore, when the object which is being photographed is replaced by a different object located at different place, causing a change in the distance between the object and the photographer, it becomes necessary to readjust the position of the objective lens from the present position in accordance with the increase in said distance. Accordingly, there arises the need for making the determination of the direction of movement to effect such adjustment of the position of the objective lens. The fact that the function of the vibration pick up means 33 of this embodiment to convert the mechanical reciprocal vibrations of the vibrating plate element 17 to simple rectangular electric signals bears an important significance on such determination of the direction as described above, will be elucidated more clearly in the following statement.

Figure 8A:
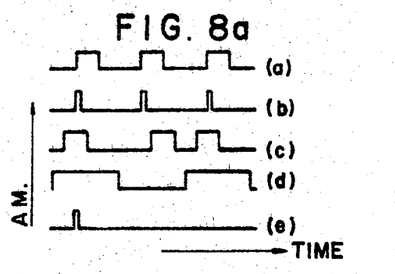
Figure 8B:
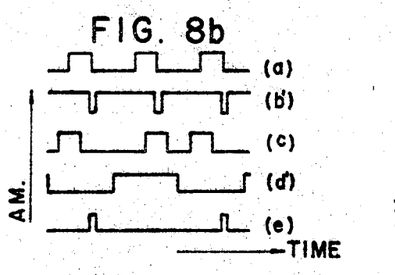
Figure 8C:
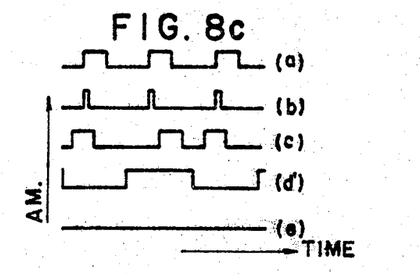
Figure 8D:
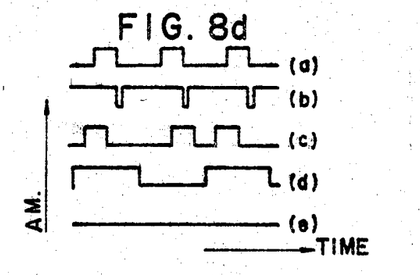
Figure 9A:
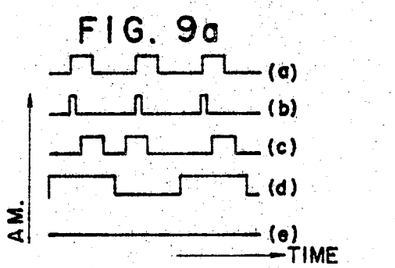
FIGS. 9a, 9b, 9c and 9d are diagrammatic representations showing the electric signal wave patterns for explaining the electric behaviors of the respective blocks shown in the embodiment of FIG. 7.
Figure 9B:
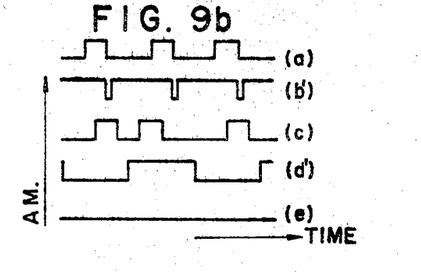
Figure 9C:
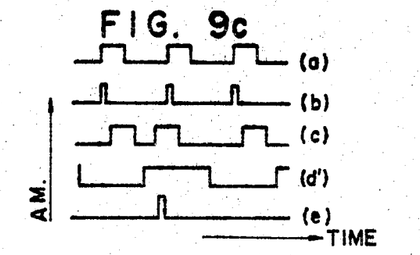
Figure 9D:
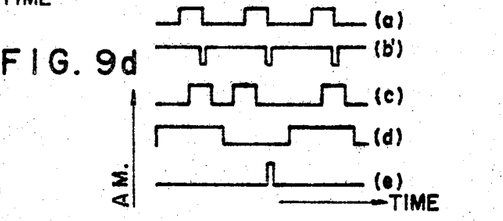

It is sufficient if the electric signal which is an output of the vibration pick up means 33 is comprised of such a simple rectangular wave as is merely indicating whether the vibrating plate element 17 is making an upward movement or a downward movement, or in other words, it may be such a rectangular wave as, for example, one which is shown in FIG. 8d and FIG. 9d where the amplitude of vibration is either nil or 1. The output of the vibration pick up means 33 is transmitted to the first gate circuit 27 and to the second subsidiary gate circuit 30, and therefrom, it is transmitted, via a phase inverter 34, further to the first subsidiary gate circuit 28 and then to the second gate circuit 29. The outputs of the first gate circuit 27 and the first subsidiary gate circuit 28 are transmitted to a first switching circuit 37 which is adapted to supply, upon being energized by the input pulsating signal, a positive current from a power supply means 35 to the terminal 36a of a servomotor 36. Also, the output of the second gate circuit 29 and the output of the second subsidiary gate circuit 30 are both transmitted to a second switching circuit 38 which is adapted to supply, upon being energized by the input pulsating signal, a negative current from the power supply means 35 to the terminal 36a of said servomotor 36. The servomotor 36 will no longer rotate and will stop its rotation where there is supplied thereto no positive or negative current from each of the first switching circuit 37 and the second switching circuit 38, or where there are supplied thereto equal amounts of either positive currents or negative currents from these two switching circuits. Referring to FIGS. 8a through 8d and FIGS. 9a through 9d, it will be conjectured that the servomotor 36 is so arranged as will stop its rotation whenever there is established a balance by the equal amounts of either positive currents or negative currents which are supplied thereto from these two switching circuits. The rotation of the servomotor 36 is transmitted, by such mechanical elements as cam, gear, lever or the like, to the movable lens 11 and the objective lens 39. Therefore, when, due to the movement of the movable lens 11, the phases of the rectangular output waves of the first and the second amplifiers 22 and 23 (these two kinds of waves indirectly representing the intensities of light coming from the object) are brought into agreement to each other, the servomotor will stop its rotation. As has been stated previously, the displacement relationship between the movable lens 11 and the objective lens 39 is determined by taking the distance s and the distance d to the object into consideration. The mainly electric behaviors of the constitutional elements will be understood in further detail by referring to FIGS. 8a through 8d and FIGS. 9a through 9d.

FIGS. 8a, 8b, 8c and 8d represent the waveforms which indicate the respective behaviors of the first gate circuit 29, first subsidiary gate circuit 30, the second gate circuit 31 and the second subsidiary gate circuit 32 in the case where the output wave of the first amplifier 22 corresponding to the movable lens 11 is advanced beyond the phase of the output wave of the second amplifier 23 corresponding to the fixed lens 12. In FIG. 8a, a represents the rectangular output wave of the second amplifier; b represents the output pulsating wave of the first shaping circuit 31 which is of a narrow breadth that has been so converted from the rectangular output wave a at the rising-up position of the latter wave; c represents a rectangular output wave having an advanced phase, of the first amplifier 22; d represents a simple rectangular wave of the vibration pick up means 33, indicating the direction of vibrations of the vibrating plate element 17; and e represents the output wave of the first gate circuit where said first gate circuit 27 is comprised of an "AND" circuit. As is well known, an "AND" circuit is adapted to generate an output signal only when there are simultaneously present all of the input signals. On the other hand, a "NAND" circuit is adapted for generating an output signal only where all of the input signals are nil. In FIG. 8b, b' represents the output pulsating wave of the second shaping circuit 32 where the rectangular output wave a is converted to a pulsating wave of a narrow breadth at the depressed position of said rectangular output wave a; d' represents a rectangular wave which is produced by inverting the output rectangular wave d of the vibration pick up means 33 by the use of the phase inverter 34. By recalling the fact that, in this example, the first subsidiary gate circuit 28 is comprised of a "NAND" circuit, it will be noted that, when the signal waves shown at b', c and d' are supplied, as inputs, to the first subsidiary gate circuit 28, this latter circuit will generate the output signal which is shown at e. In FIG. 8c, there exists no position in which b, c and d' overlap at the same time, and as a consequence, there is generated no output signal from the second gate circuit 29. In FIG. 8d also, it will be understood that there is generated no output signal from the second subsidiary gate circuit 30. After all, where the phase of the rectangular output wave of the first amplifier 22 which is associated with the movable lens 11 is advanced, an input pulsating signal is supplied only to the first switching circuit 37. As a result, a positive current is supplied from the power supply means 35 to the servomotor 36. The rotation of the servomotor 36 continues until the phase of the output rectangular wave of the first amplifier 22 is delayed owing to the movement of the movable lens 11 and till, thereby, the two phases of the output rectangular waves of the first and the second amplifiers perfectly agree to each other.

The behaviors shown in FIGS. 9a through 9d will be easily understood by referring to the behaviors described in connection with FIGS. 8a through 8d and by carefully observing the drawing, and therefore, detailed explanation thereof is omitted here, but only the conclusion will be stated. In case the phase of the output wave of the first amplifier is delayed, there is supplied an input pulsating signal only to the second switching circuit 38 as will be understood in FIGS. 9c and 9d. Accordingly, a negative current will be supplied to the servomotor 36, with the result that the movable lens 11 will move in the direction in which the phase of the output wave of the first amplifier 22 is advanced.

Accordingly, the servomotor continues its rotation until the difference between the two phases of the output waves of the first and the second amplifiers 22 and 23 becomes nil, thus adjusting the positions of the movable lens 11 and the objective lens 39. As a result of this adjustment, the objective lens 39 will be able to automatically focus the image of the object onto the face of the film.

From the foregoing statement, there will be clearly understood the advantage accruing from not directly utilizing the output of the light responsive electric means which directly expresses the pattern of the object scanned by a slit in order to adjust the position of the objective lens, but from utilizing the output after converting it to a rectangular wave.

A couple of preferred embodiments of the present invention have been described in associate with the behaviors illustrated in the drawing. It should be understood by those skilled in the art that many modifications and changes of the present invention may be made without departing the spirit of the present invention. Therefore, the invention should not be understood only within the limits of these embodiments presented above, but it should be limited by the claims affixed herewith.

We claim:

1. An improvement in the electric distance measuring apparatus in an automatic focusing apparatus equipped with an electric distance measuring means and arranged so as to control an objective lens by the electric signal generated from said means, said improvement residing in the arrangement comprising:

a movable lens adapted to be controllable in the direction perpendicular to its optical axis, and a fixed lens having its optical axis in parallel with the optical axis of said movable lens;

a vibrating plate element disposed on an image focusing plane common to said two lenses and provided with a first slit disposed in a position corresponding to said movable lens and a second slit disposed in a position corresponding to said fixed lens;

a first light responsive means and a second light responsive means each being disposed closely behind said vibrating plate element and containing a photoelectric element adapted to convert the intensities of light varying with the contrasts of the image of the object to be photographed after passing through said first and second slits to electric signals directly expressing said image;

a first amplifier and a second amplifier adapted to amplify the electric signals of said first and second light responsive means till said signals are saturated and to thereby covert the resultant signals to rectangular waves, respectively; and a phase discriminating means for discriminating the phase relationship of the pair of rectangular waves obtained from said two amplifiers.

2. An electric distance measuring apparatus according to claim 1, wherein said photoelectric elements of said first and second light responsive means are adhered closely to the rear side of said first and second slits, respectively, of said vibrating plate element.

3. An automatic focusing apparatus comprising a movable lens adapted to be controllable in the direction perpendicular to its optical axis, and a fixed lens having its optical axis in parallel with the optical axis of said movable lens;

a vibrating plate element disposed on an image focusing plane common to said two lenses and provided with a first slit disposed in a position corresponding to said movable lens and a second slit disposed in a position corresponding to said fixed lens;

a first light responsive means and a second light responsive means each being disposed closely behind said vibrating plate means and containing a photoelectric element adapted to convert the intensities of light varying with the contrasts of the image of the object to be photographed after passing through said first and second slits to electric signals directly expressing said image;

a first amplifier and a second amplifier adapted to amplify the electric signals of said first and second light responsive means till said signals are saturated and to thereby convert the resultant signals to rectangular waves, respectively;

a first shaping circuit adapted to produce a pulsating wave of a narrow breadth at the rising -up position of said rectangular wave representing the output of said second amplifier, and a second shaping circuit adapted to produce a pulsating wave of a narrow breadth at the depressed position of said rectangular wave;

a vibration pick up means for converting the vibrations of said vibrating plate element to electric rectangular pulsating waves;

a phase inverter for inverting the phase of said rectangular pulsating waves representing the output of said vibration pick up means;

a first gate circuit using, as its input signals, the outputs of said first amplifier, said first shaping circuit and said vibration pick up means;

a first subsidiary gate circuit using, as its input signals, the outputs of said first amplifier, said second shaping circuit and said phase inverter;

a second gate circuit using, as its input signals, the outputs of said first amplifier, said first shaping circuit and said phase inverter;

a second subsidiary gate circuit using, as its input signals, the outputs of said first amplifier, said second shaping circuit and said vibration pick up means;

a first switching circuit for cutting off and passing a positive current by being energized by the outputs of said first gate circuit and said first subsidiary gate circuit;

a second switching circuit for cutting off and passing a negative current by being energized by the outputs of said second gate circuit and said second subsidiary gate circuit;

a power supply means; a servomotor connected to said first and second switching circuits and adapted for effecting the movement of said movable lens and an objective lens matched therewith; and there being provided an arrangement that the positions of said movable lens and said objective lens are adjusted by said servomotor so that the phases of a pair of rectangular waves representing the outputs of said first and second amplifiers will agree to each other.

4. An automatic focusing apparatus according to claim 3, wherein said first and second gate circuits are each comprised of an "AND" circuit and said first and second subsidiary gate circuits are each comprised of a "NAND" circuit.